(12) United States Patent
Smith

(10) Patent No.: US 8,706,766 B2
(45) Date of Patent: *Apr. 22, 2014

(54) SYSTEM AND METHOD FOR TRIGGERING A PROVISIONING EVENT

(75) Inventor: Christopher David Smith, Burlington (CA)

(73) Assignee: BlackBerry Limited, Waterloo (CA)

( * ) Notice: Subject to any disclaimer, the term of this patent is extended or adjusted under 35 U.S.C. 154(b) by 238 days.

This patent is subject to a terminal disclaimer.

(21) Appl. No.: 13/236,762

(22) Filed: Sep. 20, 2011

(65) Prior Publication Data

US 2012/0011163 A1    Jan. 12, 2012

Related U.S. Application Data

(63) Continuation of application No. 10/643,029, filed on Aug. 18, 2003, now Pat. No. 8,060,530.

(60) Provisional application No. 60/403,634, filed on Aug. 16, 2002.

(51) Int. Cl.
   *G06F 17/30*    (2006.01)

(52) U.S. Cl.
   USPC .......................................... 707/793; 707/702

(58) Field of Classification Search
   None
   See application file for complete search history.

(56) References Cited

U.S. PATENT DOCUMENTS

| 5,465,288 A | 11/1995 | Falvey et al. |
| 5,519,758 A | 5/1996 | Tabbane |
| 6,104,796 A | 8/2000 | Kasrai |
| 6,144,849 A | 11/2000 | Nodoushani et al. |
| 6,385,651 B2 | 5/2002 | Dancs et al. |
| 6,542,739 B1 | 4/2003 | Garner |
| 6,980,817 B1 | 12/2005 | Chow et al. |
| 7,111,077 B1 | 9/2006 | Starkovich et al. |
| 7,577,834 B1 | 8/2009 | Traversat et al. |
| 2002/0176378 A1 | 11/2002 | Hamilton et al. |
| 2003/0027581 A1 | 2/2003 | Jokinen et al. |
| 2003/0065738 A1 | 4/2003 | Yang et al. |
| 2003/0217127 A1 | 11/2003 | Sinn |
| 2004/0058652 A1 | 3/2004 | McGregor et al. |
| 2004/0082323 A1 | 4/2004 | Smith |
| 2004/0087300 A1 | 5/2004 | Lewis |
| 2004/0088737 A1 | 5/2004 | Donlan et al. |

(Continued)

FOREIGN PATENT DOCUMENTS

EP    1 009 175 A2    6/2000

OTHER PUBLICATIONS

Gellens, R.: "Wireless Device Configuration (OTASP/OTAPA) Via ACAP," Network Working Group Request for Comments, Jun. 1999, pp. 1-29, XP002270237.

(Continued)

*Primary Examiner* — Syed Hasan

(74) *Attorney, Agent, or Firm* — Jones Day

(57) ABSTRACT

Systems and methods are provided for triggering a provisioning event in a service provider using a provisioning request message generated by an external system. A provisioning system may be used to receive the provisioning request message from the external system and transmit information in the provisioning request message to the service provider to trigger the provisioning event. The provisioning request message may have a data structure that includes a header section and a body section. The body section may contain a provisioning entity section that includes information identifying an entity to which the provisioning event pertains, wherein the provisioning entity section includes one or more attributes defined by the external system.

22 Claims, 4 Drawing Sheets

(56) References Cited

U.S. PATENT DOCUMENTS

2004/0153552 A1    8/2004    Trossen et al.
2004/0203615 A1    10/2004    Qu et al.
2004/0242209 A1    12/2004    Kruis et al.
2009/0177350 A1    7/2009    Williams et al.

OTHER PUBLICATIONS

Sun Microsystems, Inc.: "RPC: Remote Procedure Call Protocol Specification," Network Working Group Request for Comments, Apr. 1988, pp. 1-24, XP002915168.

SYSTEM AND METHOD FOR TRIGGERING A PROVISIONING EVENT

CROSS-REFERENCE TO RELATED APPLICATIONS

This is a continuation of U.S. application Ser. No. 10/643,029, filed Aug. 18, 2003, which claims priority from U.S. Provisional Application No. 60/403,634, filed Aug. 16, 2002, both applications hereby incorporated herein by reference.

FIELD

The technology described in this patent document relates generally to the field of provisioning systems. More particularly, the patent document describes a system and method for triggering a provisioning event that is particularly well-suited for triggering provisioning events in a mobile data service from an external system.

BACKGROUND AND SUMMARY

Provisioning is a general term that is commonly used in the field of mobile communications in reference to the process by which services provided by a service provider are managed. In accordance with the teachings described herein, systems and methods are provided for triggering a provisioning event in a service provider using a provisioning request message generated by an external system. A provisioning system may be used to receive the provisioning request message from the external system and transmit information in the provisioning request message to the service provider to trigger the provisioning event. The provisioning request message may have a data structure that includes a header section and a body section. The body section may contain a provisioning entity section that includes information identifying an entity to which the provisioning event pertains, wherein the provisioning entity section includes one or more attributes defined by the external system.

DETAILED DESCRIPTION

Figure 1:
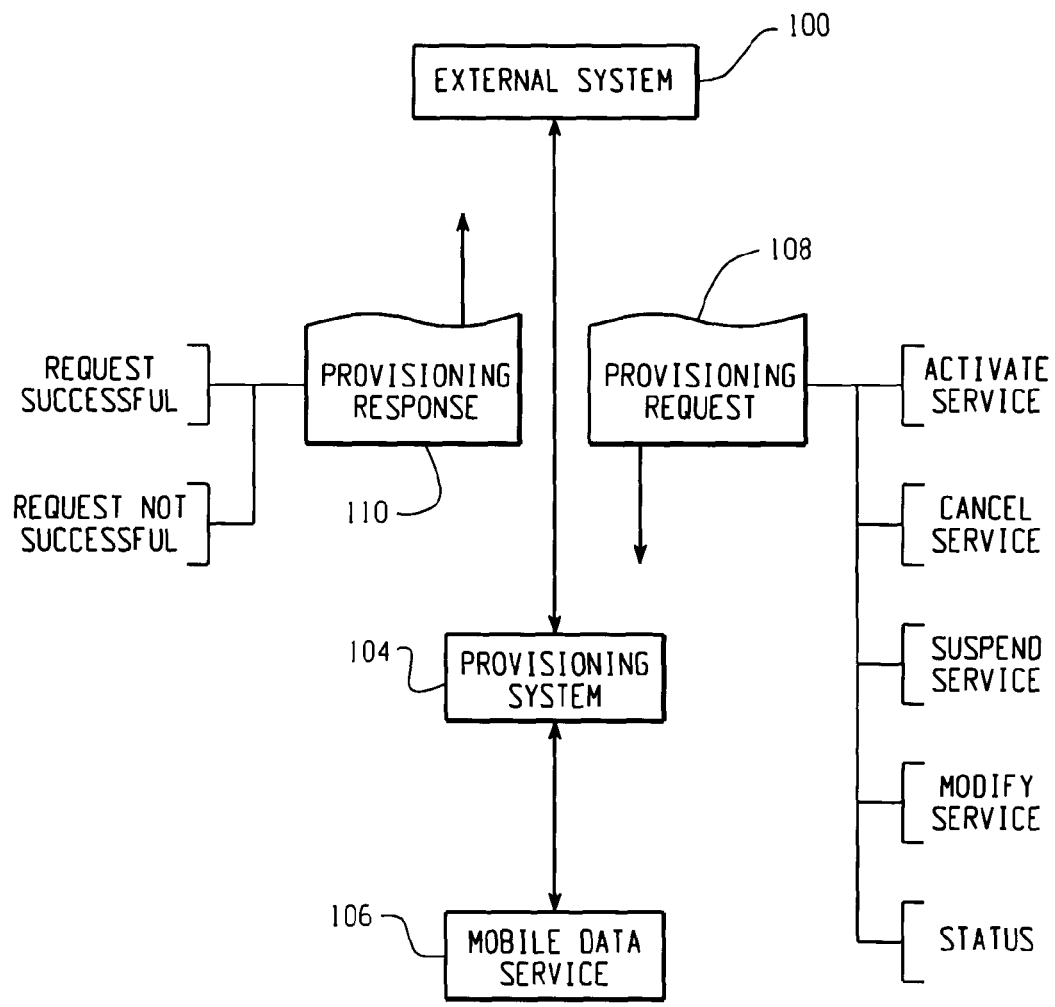
FIG. 1 is a block diagram of an example system for provisioning a mobile data service.

With reference now to the drawing figures, FIG. 1 is a block diagram of an example system for provisioning a mobile data service 106. The system includes an external system 100, a provisioning system 104 and a mobile data service 106. Also illustrated are a provisioning request 108 transmitted from the external system 100 to the provisioning system 104 and a provisioning response 110 transmitted from the provisioning system 104 to the external system 100.

In operation, the provisioning system 104 enables an external system 100 to trigger provisioning events for a mobile data service 106. Examples of provisioning events are activation of a service, deactivation of a service, suspension of a service, resumption of a service, modification of a service profile or service parameters, and gathering of status information associated with a service.

The mobile data service 106 includes the various systems and devices used to provide access to a wireless network from a mobile communication device. The mobile data service 106 may, for example, enable a mobile communication device to send and receive data, such as electronic mail, over a wireless network. It should be understood, however, that other service providers in addition to a mobile data service 106 may also be provisioned using the provisioning system 106.

The external system 100 may be any system or service external to the mobile data service 106 that is authorized to trigger provisioning events for the mobile data service 106. An example of an external system 100 is a reseller of the mobile data service 106 through which end-users can purchase contracts enabling them to use the mobile data service 106.

In order to trigger provisioning events, the external system 100 sends a provisioning request 108 to the provisioning system 104. As noted above, provisioning events that may be triggered by a provisioning request 108 include service activation, service cancellation, suspension of service, service modification, a service status request, or others. Upon receiving the provisioning request 108, the provisioning system 104 triggers the specified event in the mobile data service 106. The provisioning system 104 may also respond to the external system 100 by sending a provisioning reply 110. The provisioning reply 110 may, for example, indicate whether the requested operation succeeded or failed, specify error and status information, or include other relevant information.

The provisioning system 104 may communicate with the mobile data service 106 using any supported protocol. For example, protocols supported by the mobile data service 106 may include Remote Method Invocation (RMI), Remote Procedure Call (RPC) and Lightweight Directory Access Protocol (LDAP).

In order to communicate with a plurality of different external systems 100, the provisioning system 104 may expose an interface that can be accessed using a widely supported and accessible protocol. For example, the provisioning system 104 may include a Java™ servlet which monitors for provisioning messages 108 on a computer network using the Secure Hypertext Transfer Protocol (HTTPS).

The provisioning messages 108, 110 may contain complex and diverse request and response details. For example, a provisioning message 108, 110 may specify a mobile communication device for which it is requesting activation on the mobile data service 106. Since there are many mobile data services available, and each of these services typically has a different system for identifying mobile communication devices, the format of provisioning messages 108, 110 should be able to handle these complexities. Therefore, provisioning messages 108, 110 may be formatted in such a way that the message can express complex provisioning requests and responses, while being easily constructed and interpreted by a plurality of different external systems 100. In addition, the format of a provisioning message 108, 110 may allow for security credentials to be exchanged, so that the provisioning system 104 may verify the identity of an external system 100 that sends a provisioning request 108, and so that the external system 100 may verify the identity of a provisioning system 104 that sends a provisioning reply 110.

Figure 2:
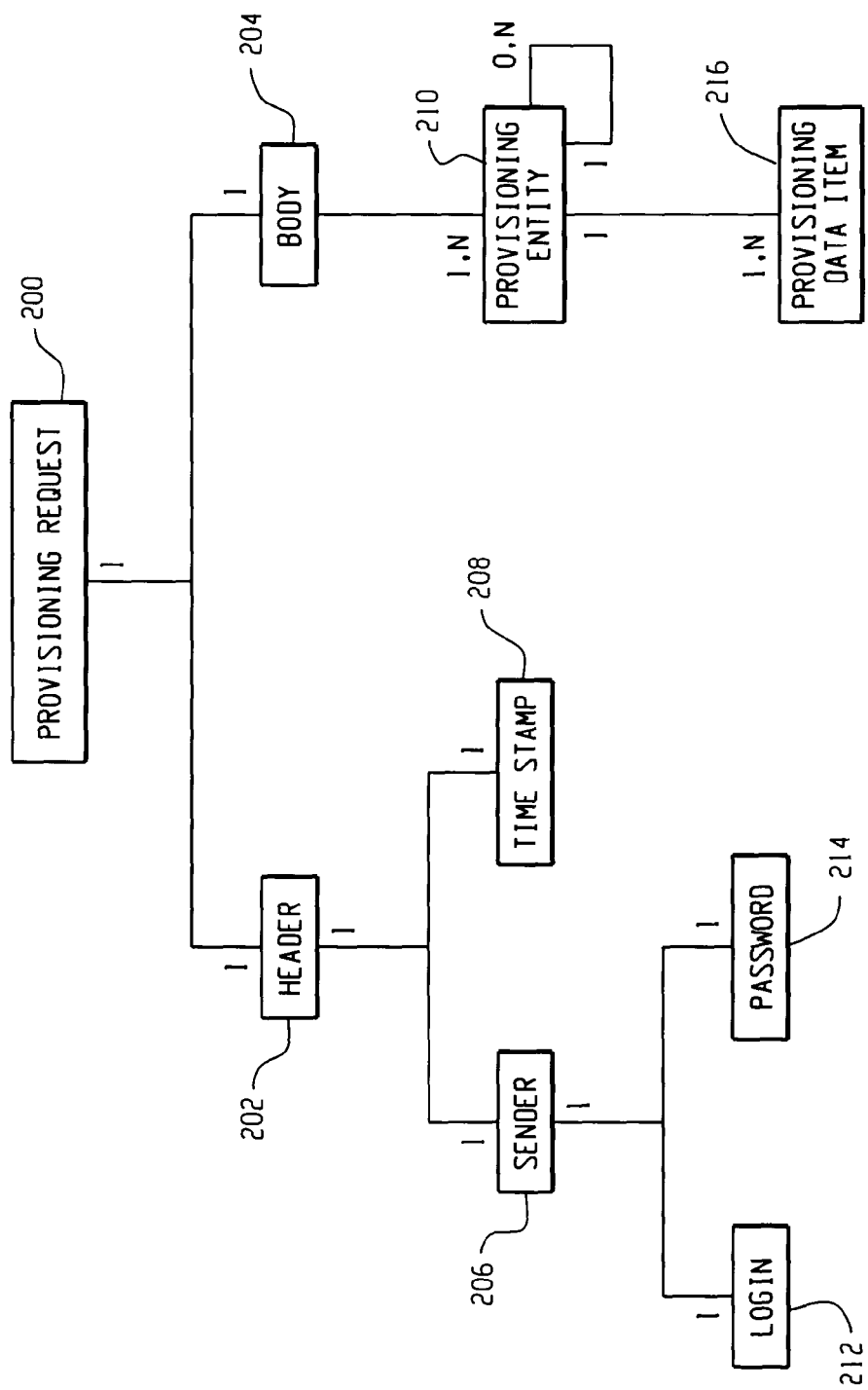
FIG. 2 is an entity relationship diagram of an example provisioning request message format.
Figure 3:
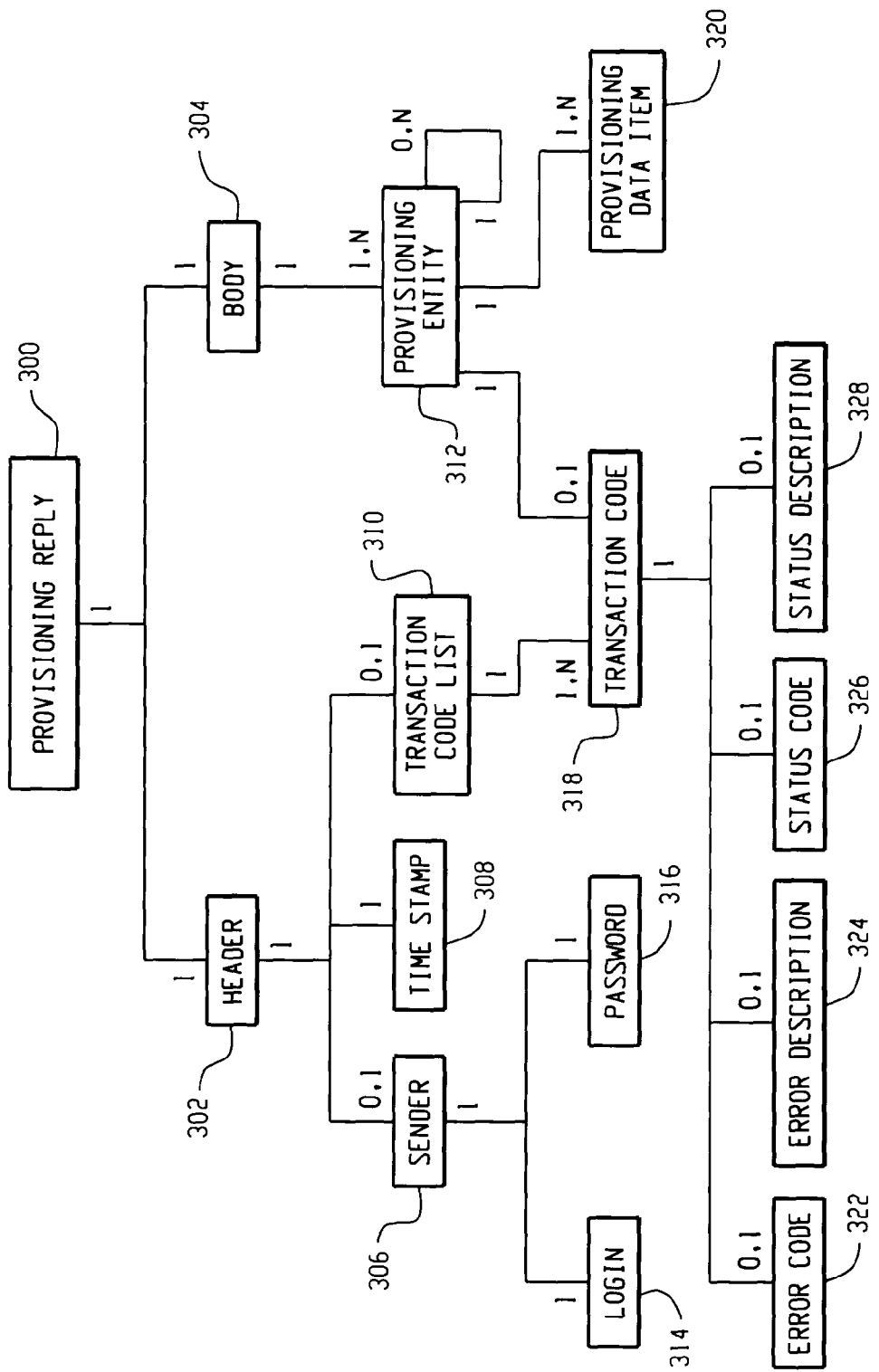
FIG. 3 is an entity relationship diagram of an example provisioning reply message format.

FIGS. 2 and 3 are entity relationship diagrams of an example provisioning request message format and an example provisioning reply message format, respectively. The message format defines the structure of data entities within the provisioning message. Data entities are represented in FIGS. 2 and 3 within rectangular boxes, and relationships between the data entities are represented by lines connecting the rectangular boxes. On each side of a connecting line, the cardinality of the relationship is illustrated by a numeral or set of numerals (with "N" representing a variable). For example, data entities 200 and 204 (FIG. 2) are connected by a line having a numeral 1 at each side of the relationship. This illustrates a one-to-one relationship between data entities 200 and 204. Data entities 204 and 210, however, are connected by a line having a numeral 1 on one side of the relationship and a set of numerals {1, N} on the other side of the relationship. This illustrates that data entities 204 and 210 may have either a one-to-one relationship or a one-to-many relationship.

With reference to FIG. 2, a provisioning request 200 message may include a transaction identification attribute, which contains a unique transaction identifier used by the provisioning system 104 (FIG. 1) to identify a particular transaction. A transaction consists of a provisioning request, a resulting provisioning event, and a provisioning response. The provisioning request 200 message may also include a version attribute, which represents the version of the interface. The provisioning request message 200 may include a transaction type attribute, which defines the type of action being requested. As noted above, the type of action requested may be to activate, suspend, resume, cancel, modify or obtain status information regarding a service. In addition, the provisioning request 200 message may also include a product type attribute, which specifies the service to which the provisioning request pertains, such as a particular mobile data service.

The provisioning request 200 message contains a header section 202 and a body section 204 section. The header section 202 contains a sender section 206, which contains information relating to the sender of the provisioning message, and a time stamp section 208, which contains the time that the message was sent. The sender section 206 may include an identification attribute, which contains a unique identifier for the sender. The sender section 206 may also include a name attribute, which contains a unique name for the sender.

The sender section 206 contains a login section 212 and a password section 214, which may be used by the provisioning system 104 (FIG. 1) to authenticate the identity of the sender. Authentication prevents unauthorized external systems from successfully interfacing with the provisioning system 104 (FIG. 1).

The time stamp section 208 may include a format attribute, which specifies a date format for the timestamp, such as that defined by the ISO-8601 standard.

The body section 204 contains one or more provisioning entity sections 210 that may be defined by the external system. A provisioning entity section 210 identifies an entity to which the provisioning request applies. A provisioning entity section 210 may include a name attribute which contains generic information identifying the entity, such as information identifying the entity as a mobile communication device. The provisioning entity section 210 may also have a type attribute, which contains further information to identify the entity, such as the model number for a mobile communication device.

In addition, a provisioning entity section 210 may contain one or more additional nested provisioning entity sections 210 to provide for a hierarchical provisioning entity structure. For example, an external system may have a subscriber-centric view of the data and therefore define a top-level provisioning entity section 210 to represent a subscriber object, which may be identified by specific provisioning data items attributes, such as MSISDN, IMSI, or others. Specific services and entities (e.g., mobile communication devices) may then be represented within the top-level provisioning entity 210 as additional (i.e., nested) provisioning entity sections 210 for the purposes of provisioning.

In another example of nested provisional entity sections 210, an external system may have a service-centric view of the data and therefore define a top-level provisioning entity section 210 to represent a service, which may be identified by specific provisioning data item attributes such as price, service plan type, service number, or others. Specific entities (e.g., mobile communication devices) and subscribers may then be represented within the top-level provisioning entity as additional (i.e., nested) provisioning entity sections. A number of subscribers may then be nested such that each subscriber represents a separate provisioning transactions within the broader context of the provisioning request (e.g., a batch service activation for a plurality of subscribers).

Each provisioning entity section 210 contains one or more provisioning data item sections 216. A provisioning data item 216 section contains information that identifies a particular entity to which the provisioning request pertains. Because numerous types of entities may be provisioned, a provisioning data item section 216 includes a name attribute, which specifies the type of information that is contained in the section. For example, the name attribute may specify that the provisioning data item section 216 contains a Personal Identification Number (PIN), a product identifier, a billing identifier, an International Mobile Equipment Identification identifier (IMEI), an electronic serial number (ESN), an International Mobile Subscriber Identity identifier (IMSI), a Mobile Subscriber Integrated Services Digital Network number (MSISDN), or an Integrated Circuit Card Identifier (IC-CID). Thus, the message can specify requests to provision entities on a plurality of diverse systems that use different schemes for identifying entities.

Provisioning request messages 200 may, for example, be written in Extensible Markup Language (XML). XML is a widely supported language that is used to define the format of information to be exchanged between different systems and organizations. The format of an XML message is defined by a Document Type Definition (DTD). An example DTD that may be used to create an XML message that contains a provisioning request conforming to the formal illustrated in FIG. 2 is set forth in U.S. Provisional Application No. 60/403,634, which has been incorporated herein by reference.

With reference now to FIG. 3, a provisioning reply message 300 may include the same attributes described above with reference to the provisioning request message 200 of FIG. 2, such as a transaction identification attribute, a version attribute, a transaction type attribute, and a product type attribute. The provisioning reply message 300 contains a header section 302 and a body section 304.

The header section 302 contains a time stamp section 308, and may contain a sender section 306 and a transaction code list section 310. The time stamp section 308 may include a format attribute, which specifies a date format for the timestamp, such as that defined by the ISO-8601 standard. The sender section 306 may contain login 314 and password 316 sections, which an external system 100 may use to authenticate a provisioning system 104 by sending a provisioning reply.

It may, for example, be useful to authenticate a provisioning system 104 when provisioning messages are sent asynchronously. In asynchronous messaging, a provisioning reply message is not returned in response to a provisioning request method. Instead, an asynchronous messaging system returns an acknowledgement to indicate that a message was successfully received. A provisioning reply is not sent until after the provisioning request has been processed. Thus, it is useful for the external system 100 to verify the identity of the system that has sent the response prior to taking any action based on the contents of the provisioning reply.

The transaction code list section 310 section may be used by the provisioning system 104 to return error information or status information relating to a provisioning request to the system that has sent the request. The transaction code list section 310 may include a major code attribute, which defines the most severe error returned in the message. The transaction code list section 310 may also include a description attribute, which describes the error defined by the major code.

The transaction code list section 310 contains one or more transaction code sections 318. Each transaction code section 318 may contain an error code section 322, an error description section 324, a status code section 326 and a status description section 328. The error code section 322 specifies an error occurring while the provisioning system 104 performs the action requested in a provisioning request message. The error description section 324 describes the error specified in the error code 322 section. The status code section 326 identifies the status of a provisioning system entity resulting from the processing triggered by provisioning request. The status description section 328 describes the status specified in the status code section 326.

Values for the error code section 322 and the error description section 324, and for the major code attribute of the transaction code list section 310, may be defined by the provider of the provisioning system 104, and may include the following examples:

| Error Code | Major Code | Error Description |
| --- | --- | --- |
| 0 | N/A | Success |
| 21020 | 21000 | Service Already Active |
| 21030 | 21000 | Service Not Suspended |
| 21040 | 21000 | Service Deactivated |
| 21050 | 21000 | Service Suspended |
| 21510 | 21500 | No line items found |
| 46010 | 46000 | Insufficient Permission to Request Activation |
| 46020 | 46000 | Insufficient Permission to Request Deactivation/Modification |
| 46030 | 46000 | Insufficient Permission to Request Suspend |
| 46040 | 46000 | Insufficient Permission to Request Resume |
| 61020 | 61000 | Invalid Data: Missing Billing Identifier |
| 61030 | 61000 | Invalid Data: Insufficient Input |
| 61040 | 61000 | Invalid Request: Service Inactive/Service Not Found in Database |
| 61080 | 61000 | Invalid Data: Missing IMSI |
| 61090 | 61000 | Invalid Data: Missing Input Information |
| 61100 | 61000 | Length must satisfy range |
| 61110 | 61000 | Must belong to set |
| 61120 | 61000 | Must satisfy both length range and content format |
| 61130 | 61000 | Internal Error: Please contact product support |
| 61210 | 61000 | Invalid Data: Requestor Resolved to Other |
| 61220 | 61000 | Invalid Data: Requestor Not Found |
| 61510 | 61500 | System Error: Please try again later |

Values for the status code section 326 and the status description section 328 may be defined by the provider of the provisioning system 104, and may include the following examples:

| Status Code | Status Description |
| --- | --- |
| 1 | Service Deactivated |
| 2 | Service Deactivated after Modification |
| 5 | Service Suspended |
| 11 | Service Activated |
| 17 | Service Activated via Handheld |
| 18 | Service Activated via Request |

The body section 304 of the provisioning reply 300 contains one or more provisioning entity sections 312. Each provisioning entity section 312 may include one or more additional nested provisioning entity sections 312, as described above. In addition, each provisioning entity section 312 may contain one or more provisioning data item section 320. The body section 304, including the provisioning entity 312 and provisioning data item 320 sections, are similar to those described above with reference to FIG. 2.

In addition, the provisioning entity section 312 in the provisioning reply message 300 may also contain a transaction code section 318 section, as described above, which specifies error or status information related to the provisioning entity section 312 in which it is contained.

An example DTD that may be used to create an XML message that contains a provisioning reply message conforming to the format illustrated in FIG. 3 is set forth in U.S. Provisional Application No. 60/403,634, which has been incorporated herein by reference. Also included in incorporated U.S. Provisional Application 60/403,634 are example XML programs to perform provisioning transactions that are comprised of a provisioning request and a provisioning reply, including transactions to activate a service, cancel a service, suspend a service, modify a service, and provide status information for a service.

Figure 4:
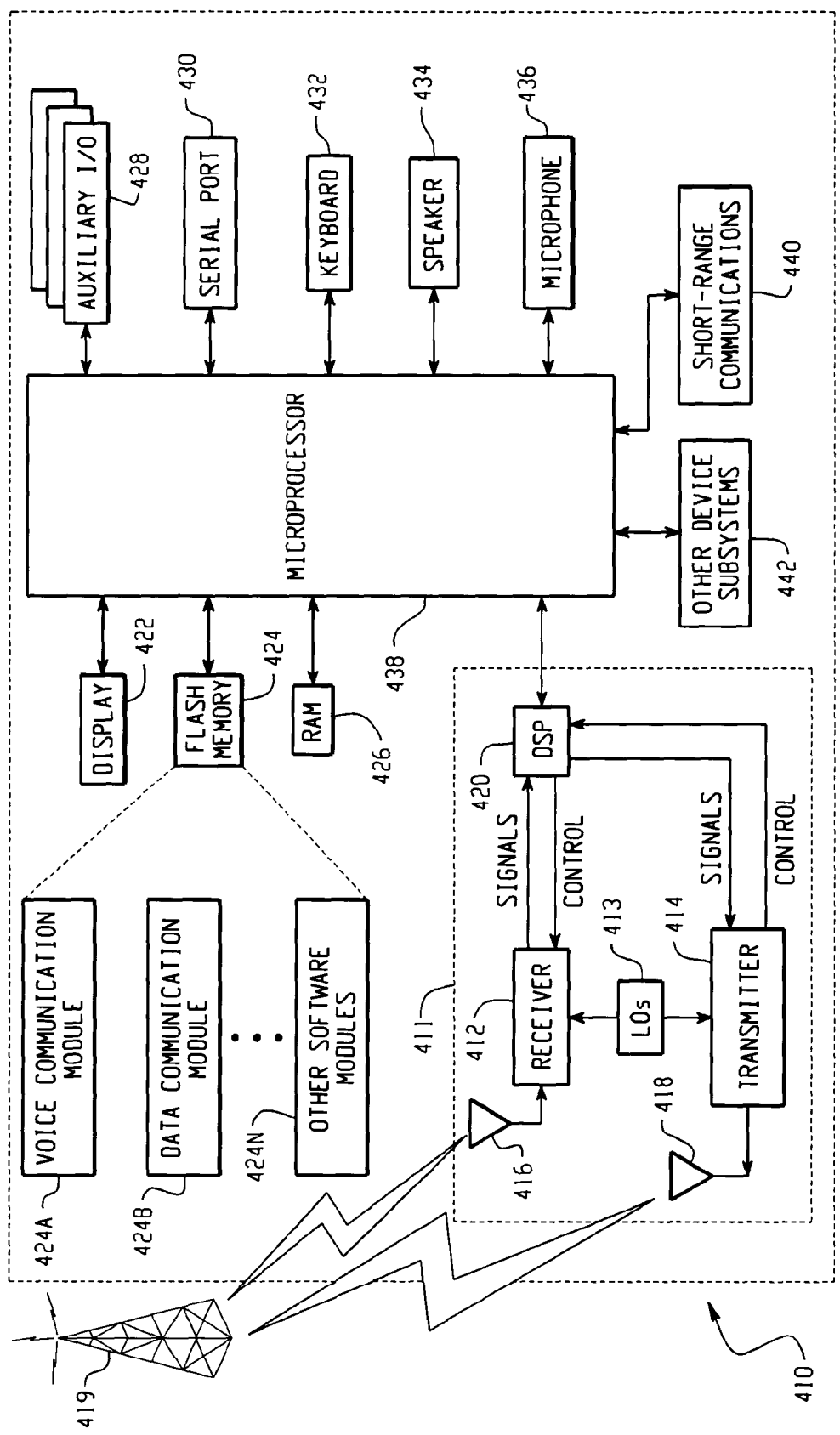
FIG. 4 is a block diagram of a mobile communication device that may be used with a mobile data service.

FIG. 4 is a block diagram of a mobile communication device 410 that may be used with a mobile data service 106, as described above. That is, the communication device 410 is an example of a provisioning entity 210 for which a provisioning system 104 may provision a mobile data service 106 in response to a provisioning request message 200.

The mobile communication device 410 includes a transceiver 411, a microprocessor 438, a display 422, a Flash memory 424, a RAM memory 426, auxiliary input/output (I/O) devices 428, a serial port 430, a keyboard 432, a speaker 434, a microphone 436, a short-range wireless communications sub-system 440, and may also include other device sub-systems 442. The transceiver 411 preferably includes transmit and receive antennas 146, 418, a receiver 412, a transmitter 414, one or more local oscillators 413, and a digital signal processor 420. Within the Flash memory 424, the device 410 preferably includes a plurality of software modules 424A-424N that can be executed by the microprocessor 438 (and/or the DSP 420), including a voice communication module 424A, a data communication module 424B, and a plurality of other operational modules 424N for carrying out a plurality of other functions.

The mobile communication device 410 is preferably a two-way communication device having voice and data communication capabilities. That is, the device may communicate over a voice network, such as an analog or digital cellular networks, and may also communicate over a data network. The voice and data networks are depicted in FIG. 4 by the communication tower 419, and may be separate communication networks using separate infrastructure, such as base stations, network controllers, etc., or may be integrated into a single wireless network.

The communication subsystem 411 is used to communicate with the voice and data network 419, and includes the receiver 412, the transmitter 414, the one or more local oscillators 413, and may also include the DSP 420. The DSP 420 is used to send and receive signals to and from the transmitter 414 and receiver 412, and is also utilized to receive control information from the transmitter 414 and to provide control information to the receiver 412. If the voice and data communications occur at a single frequency, or closely-spaced set of frequencies, then a single local oscillator 413 may be used in conjunction with the transmitter 414 and receiver 412. Alternatively, if different frequencies are utilized for voice communications and data communications, then a plurality of local oscillators 413 can be used to generate a plurality of frequencies corresponding to the voice and data networks 419. It should be understood that although two antennas 416, 418 are depicted in FIG. 4, the mobile device 410 could be used with a single antenna structure.

Information, which includes both voice and data information, is communicated to and from the communication module 411 via a link between the DSP 420 and the microprocessor 438. The detailed design of the communication subsystem 411, such as frequency band, component selection, power level, etc., may be dependent upon the communication network 419 in which the device is intended to operate. For example, the device 410 may include a communication subsystem 411 designed to operate with the Mobitex™, DataTAC™ and/or General Packet Radio Service (GPRS) data communication networks and may also be designed to operated with any of a variety of voice communication networks, such as GSM, AMPS, TDMA, CDMA, PCS, etc. Other types of data and voice networks, both separate and integrated, may also be utilized with the mobile device 410.

Depending upon the type of network 419 (or networks), the access requirements for the dual-mode mobile device 410 may also vary. For example, in the Mobitex and DataTAC data networks, mobile devices are registered on the network using a unique identification number associated with each device. In GPRS data networks, however, network access is associated with a subscriber or user of a device 410. A GPRS device typically requires a subscriber identity module ("SIM"), which is required in order to operate the device 410 on a GPRS network. Local or non-network communication functions (if any) may be operable, without the SIM device, but the device 410 will be unable to carry out any functions involving communications over the data network 419, other than any legally required operations, such as 911 emergency calling.

After any required network registration or activation procedures have been completed, the mobile communication device 410 may send and receive communication signals, including both voice and data signals, over the network 419 (or networks). Signals received by the antenna 416 from the communication network 419 are routed to the receiver 412, which provides signal amplification, frequency down conversion, filtering, channel selection, etc., and may also provide analog to digital conversion. Analog to digital conversion of the received signal allows more complex communication functions, such as digital demodulation and decoding to be performed using the DSP 420. In a similar manner, signals to be transmitted to the network 419 are processed (e.g., modulated and encoded) by the DSP 420 and are provided to the transmitter 414 for digital to analog conversion, frequency up conversion, filtering, amplification and transmission to the communication network 419 (or networks) via the antenna 418. It should be understood that although a single transceiver 411 is shown in FIG. 4 for both voice and data communications, the device 410 may include two distinct transceivers—a first transceiver for transmitting and receiving voice signals, and a second transceiver for transmitting and receiving data signals.

In addition to processing the communication signals, the DSP 420 may also provide receiver and transmitter control. For example, the gain levels applied to communication signals in the receiver 412 and transmitter 414 may be adaptively controlled through automatic gain control algorithms implemented in the DSP 420. Other transceiver control algorithms could also be implemented in the DSP 420 to provide more sophisticated control of the transceiver 411.

The microprocessor 438 preferably manages and controls the overall operation of the mobile communication device 410. The microprocessor 438 may, for example, be one of various types of microprocessors or microcontrollers, or, alternatively, may be a digital signal processor DSP 420 or some other type of processing device. Low-level communication functions, including data and voice communications, may be performed through the DSP 420 in the transceiver 411. Other, high-level communication applications, such as a voice communication application 424A and a data communication application 424B may be stored in the Flash memory 424 for execution by the microprocessor 438. For example, the voice communication module 424A may provide a high-level user interface operable to transmit and receive voice calls between the mobile communication device 410 and a plurality of other voice devices via the network 419. Similarly, the data communication module 424B may provide a high-level user interface operable to send and receive data, such as e-mail messages, files, organizer information, short text messages, etc., between the mobile communication device 410 and a plurality of other data devices via the network 419. The microprocessor 438 may also interact with other device subsystems, such as the display 422, Flash memory 424, random access memory (RAM) 426, auxiliary input/output (I/O) subsystems 428, serial port 430, keyboard 432, speaker 434, microphone 436, a short-range communications subsystem 440 and any other device subsystems generally designated as 442.

Some of the subsystems shown in FIG. 4 perform communication-related functions, whereas other subsystems may provide "resident" or on-device functions. In addition, some subsystems, such as keyboard 432 and display 422 may be used for both communication-related functions, such as entering a text message for transmission over a data communication network, and device-resident functions such as a calculator or task list or other PDA type functions.

Operating system software used by the microprocessor 438 may be stored in a persistent store such as Flash memory 424. In addition to the operation system, which controls low-level functions, the Flash memory 424 may include a plurality of high-level software application programs, or modules, such as a voice communication module 424A, a data communication module 424B, an organizer module (not shown), or any other type of software module 424N. The Flash memory 424 also may include a file system for storing data. These modules are executed by the microprocessor 438 and provide a high-level interface between a user of the device and the device. The high-level interface typically includes a graphical component provided through the display 422, and an input/output component provided through the auxiliary I/O 428, keyboard 432, speaker 434, and microphone 436. The operating system, specific device applications or modules, or parts thereof, may be temporarily loaded into a volatile store, such as RAM 426 for faster operation. Moreover, received communication signals may also be temporarily stored to RAM 426, before permanently writing them to a file system located in the persistent store 424.

An exemplary application module 424N that may be loaded onto the mobile communication device 410 is a personal information manager (PIM) application providing PDA functionality, such as calendar events, appointments, and task items. The application module 424N may also interact with the voice communication module 424A for managing phone calls, voice mails, etc., and may also interact with the data communication module for managing e-mail communications and other data transmissions. Alternatively, all of the functionality of the voice communication module 424A and the data communication module 424B may be integrated into the PIM module.

The Flash memory 424 may provide a file system to facilitate storage of PIM data items on the device. The PIM application may include the ability to send and receive data items, either by itself, or in conjunction with the voice and data communication modules 424A, 424B, via the wireless network 419. The PIM data items are preferably seamlessly integrated, synchronized and updated, via the wireless network 419, with a corresponding set of data items stored or associated with a host computer system, thereby creating a mirrored system for data items associated with a particular user.

The mobile device 410 may also be manually synchronized with a host system by placing the device 410 in an interface cradle, which couples the serial port 430 of the mobile device 410 to the serial port of the host system. The serial port 430 may also be used to enable a user to set preferences through an external device or software application, or to download other application modules 424N for installation. This wired download path may be used to load an encryption key onto the device.

Additional application modules 424N may be loaded onto the mobile communication device 410 through the network 419, through an auxiliary I/O subsystem 428, through the serial port 430, through the short-range communications subsystem 440, or through any other suitable subsystem 442, and installed by a user in the Flash memory 424 or RAM 426. Such flexibility in application installation increases the functionality of the device 410 and may provide enhanced on-device functions, communication-related functions, or both. For example, secure communication applications may enable electronic commerce functions and other such financial transactions to be performed using the device 410.

When the mobile communication device 410 is operating in a data communication mode, a received signal, such as a text message or a web page download, will be processed by the transceiver 411 and provided to the microprocessor 438, which will preferably further process the received signal for output to the display 422, or, alternatively, to an auxiliary I/O device 428. A device user may also compose data items, such as email messages, using the keyboard 432, which is preferably a complete alphanumeric keyboard laid out in the QWERTY style, although other styles of complete alphanumeric keyboards such as the known DVORAK style may also be used. User input to the device 410 is further enhanced with a plurality of auxiliary I/O devices 428, which may include a thumbwheel input device, a touchpad, a variety of switches, a rocker input switch, etc. The composed data items input by the user may then be transmitted over the communication network 419 via the transceiver 411.

When the mobile communication device 410 is operating in a voice communication mode, the overall operation of the device 410 is substantially similar to the data mode, except that received signals are preferably be output to the speaker 434 and voice signals for transmission are generated by a microphone 436. Alternative voice or audio I/O subsystems, such as a voice message recording subsystem, may also be implemented on the device 410. Although voice or audio signal output is preferably accomplished primarily through the speaker 434, the display 422 may also be used to provide an indication of the identity of a calling party, the duration of a voice call, or other voice call related information. For example, the microprocessor 438, in conjunction with the voice communication module and the operating system software, may detect the caller identification information of an incoming voice call and display it on the display 422.

A short-range communications subsystem 440 may also be included in the dual-mode device 410. For example, the subsystem 440 may include an infrared device and associated circuits and components, or a Bluetooth™ short-range wireless communication module to provide for communication with similarly-enabled systems and devices.

This written description uses examples to disclose the invention, including the best mode, and also to enable a person skilled in the art to make and use the invention. The patentable scope of the invention may include other examples that occur to those skilled in the art.

The invention claimed is:

1. A system for triggering a plurality of provisioning events using a single, hierarchical provisioning request message stored in a non-transitory computer-readable medium generated by an external system, the hierarchical provisioning request message identifying a plurality of provisioning events from a plurality of service providers to request for an entity, comprising:

a provisioning system operable to electronically receive the single, hierarchical provisioning request message from the external system and transmit information in the hierarchical provisioning request message to each of the plurality of service providers identified in the hierarchical provisioning request to trigger the provisioning events, wherein the provisioning system is separate from the external system and the plurality of service providers; and the hierarchical provisioning request message being a format-independent electronic message capable of being constructed by and interpreted by a plurality of different external systems, the hierarchical provisioning request message having a data structure that includes information identifying the entity to which the plurality of provisioning events pertain, wherein the identifying information includes one or more attributes defined by the external system, wherein the hierarchical provisioning request message further includes a provisioning event data structure associated with each of the plurality of provisioning events requested for the entity, wherein the provisioning event data structure identifies a service provider associated with a provisioning event requested for the entity.

2. The system of claim 1 wherein the plurality of provisioning events include one or more of activation of a service, deactivation of a service, suspension of a service, resumption of a service, modification of a service profile or service parameters, and obtaining status information regarding a service.

3. The system of claim 1 wherein the provisioning system uses a provisioning reply to return status or error information relating to the hierarchical provisioning request message to the external system.

4. The system of claim 1 wherein the provisioning system is in communication with the external system and the plurality of service providers, wherein a service provider is operable to communicate with the entity to cause one of the provisioning events to occur in response to receiving the information from the hierarchical provisioning request message received from the provisioning system.

5. The system of claim 1 wherein the service provider is operable to provide mobile communication service to the entity.

6. The system of claim 1, wherein the one or more attributes include a name attribute that identifies the entity.

7. The system of claim 1, wherein the one or more attributes include a type attribute that identifies an entity type of the entity.

8. The system of claim 1, wherein the service provider is a mobile data service provider.

9. The system of claim 1, wherein the hierarchical provisioning request message further includes provisioning data that identifies a particular entity to which the plurality of provisioning events pertain.

10. A system for triggering a plurality of provisioning events in a mobile communication device using a single, hierarchical provisioning request message, the hierarchical provisioning request message identifying a plurality of provisioning events to request for an entity, comprising:
  a plurality of service providers in communication with the mobile device, one or more of the plurality of service providers providing mobile communication services to the mobile device;
  a system external to the service provider, the system operable to generate the single, hierarchical provisioning request message to trigger the plurality of provisioning events;
  a provisioning system in communication with the service provider and the system, the provisioning system operable to electronically receive the single, hierarchical provisioning request message from the external system and to transmit information in the hierarchical provisioning request message to each of the plurality of service providers identified in the hierarchical provisioning request over a computer network to trigger the provisioning events in the mobile device, wherein the provisioning system is separate from the external system and the plurality of service providers; and
  the hierarchical provisioning request message being a format-independent electronic message capable of being instructed and interpreted by a plurality of different external systems, the hierarchical provisioning request message having a data structure that includes information identifying the mobile device to which the plurality of provisioning events pertain, the identifying information including one or more attributes defined by the external system, wherein the hierarchical provisioning request message further includes a provisioning event data structure associated with each of the plurality of provisioning events requested for the entity, wherein the provisioning event data structure identifies a service provider associated with a provisioning event requested for the entity.

11. The system of claim 10 and wherein the plurality of provisioning events include one or more of activation of a service, deactivation of a service, suspension of a service, resumption of a service, modification of a service profile or service parameters, and obtaining status information regarding a service.

12. The system of claim 11 wherein the status information describes the status of the mobile device after the hierarchical provisioning request message has been processed.

13. The system of claim 10 wherein the provisioning system uses a provisioning reply to return status information or error information relating to the hierarchical provisioning request message to the external system.

14. The system of claim 10 wherein the error information describes an error that occurred while the provisioning system performed an action in the hierarchical provisioning request message.

15. A system, comprising:
  a processor;
  a computer-readable storage medium containing instructions operable to cause the processor to perform operations including:
  receiving at a provisioning system, a single, hierarchical provisioning request message generated by an external system, wherein the provisioning request message is a format-independent electronic message capable of being constructed and interpreted by a plurality of different external systems, the hierarchical provisioning request message identifying a plurality of provisioning events to request for an entity, wherein the hierarchical provisioning request message includes a provisioning event data structure associated with each of the plurality of provisioning events requested for the entity, wherein the provisioning event data structure identifies a service provider associated with a provisioning event requested for the entity;
  transmitting the received hierarchical provisioning request message from the provisioning system to a plurality of service providers, one or more of the plurality of service providers being operable to process the hierarchical provisioning request message and to provide mobile communication service to the entity; and
  transmitting a received provisioning reply from the provisioning system to the external system.

16. The system of claim 15 wherein providing mobile communication service includes one or more of activation of a service, deactivation of a service, suspension of a service, resumption of a service, modification of a service profile or service parameters, and obtaining status information regarding a service.

17. The system of claim 15 wherein the provisioning reply includes status information or error information relating to the hierarchical provisioning request message, the status information describes the status of the entity after the hierarchical provisioning request message has been processed, and the error information describes an error that occurred while performing an action in the hierarchical provisioning request message.

18. A method for triggering a plurality of provisioning events using a single, hierarchical provisioning request message generated by an external system, the hierarchical provisioning request message identifying a plurality of provisioning events to request for an entity, the method comprising:
  receiving at a provisioning system, the single, hierarchical provisioning request message generated by the external system, the hierarchical provisioning request message identifying a plurality of provisioning events to request for an entity, wherein the hierarchical provisioning request message includes a provisioning event data structure associated with each of the plurality of provisioning events requested for the entity, wherein the provisioning event data structure identifies a service provider associated with a provisioning event requested for the entity;

transmitting the received hierarchical provisioning request message from the provisioning system to a plurality of service providers, one or more of the plurality of service providers being operable to process the hierarchical provisioning request message and to provide mobile communication service to the entity; and transmitting a received provisioning reply from the provisioning system to the external system.

19. The method of claim 18 wherein providing mobile communication service includes one or more of activation of a service, deactivation of a service, suspension of a service, resumption of a service, modification of a service profile or service parameters, and obtaining status information regarding a service.

20. The method of claim 18 the provisioning reply including status information or error information relating to the hierarchical provisioning request message, and the status information describing the status of the entity after the hierarchical provisioning request message has been processed, and the error information describing an error that occurred while performing an action in the hierarchical provisioning request message.

21. A mobile communication device operable in a system for triggering a plurality of provisioning events using a single, hierarchical provisioning request message stored in a non-transitory computer-readable medium generated by an external system, the hierarchical provisioning request message identifying a plurality of provisioning events from a plurality of service providers to request for an entity, the mobile communication device comprising:

a processor; and a computer-readable storage medium containing instructions operable to perform a plurality of provisioning events in response to provisioning instructions received from the plurality of service providers, wherein the provisioning instructions are triggered in response to the single, hierarchical provisioning request message generated by a provisioning system, wherein the provisioning system is operable to electronically receive the single, hierarchical provisioning request message from the external system and transmit information in the hierarchical provisioning request message to each of the plurality of service providers identified in the hierarchical provisioning request to trigger the provisioning events, wherein the provisioning system is separate from the external system and the plurality of service providers, and wherein the hierarchical provisioning request message is a format-independent electronic message capable of being constructed by and interpreted by a plurality of different external systems, the hierarchical provisioning request message having a data structure that includes information identifying the entity to which the plurality of provisioning events pertain, wherein the identifying information includes one or more attributes defined by the external system, wherein the hierarchical provisioning request message further includes a provisioning event data structure associated with each of the plurality of provisioning events requested for the entity, wherein the provisioning event data structure identifies a service provider associated with a provisioning event requested for the entity.

22. The mobile communication device of claim 1 wherein the plurality of provisioning events include one or more of activation of a service, deactivation of a service, suspension of a service, resumption of a service, modification of a service profile or service parameters, and obtaining status information regarding a service.

* * * * *